United States Patent
Fang et al.

(10) Patent No.: US 12,392,244 B2
(45) Date of Patent: Aug. 19, 2025

(54) REPAIR PROCESS USING PLASMA ETCHING

(71) Applicant: RAYTHEON TECHNOLOGIES CORPORATION, Farmington, CT (US)

(72) Inventors: Xiaomei Fang, South Glastonbury, CT (US); Jakob Reed, Holt, MI (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/336,933

(22) Filed: Jun. 16, 2023

(65) Prior Publication Data
US 2024/0418088 A1 Dec. 19, 2024

(51) Int. Cl.
*F01D 5/00* (2006.01)
*B05D 3/14* (2006.01)
*F01D 5/28* (2006.01)

(52) U.S. Cl.
CPC ............. *F01D 5/005* (2013.01); *B05D 3/142* (2013.01); *F01D 5/288* (2013.01); *B05D 2202/25* (2013.01); *B05D 2530/00* (2013.01); *F05D 2230/80* (2013.01); *F05D 2230/90* (2013.01); *F05D 2300/121* (2013.01); *F05D 2300/431* (2013.01); *F05D 2300/611* (2013.01)

(58) Field of Classification Search
CPC ......... F01D 5/005; F01D 5/288; B05D 3/142; B05D 2202/25; B05D 2530/00; B05D 5/005; F05D 2230/80; F05D 2230/90; F05D 2300/121; F05D 2300/431; F05D 2300/611; F05D 2230/12; F05D 2300/43; F05D 2300/437; F05D 2220/36; B29L 2031/08; B29L 59/14; B29C 73/02
See application file for complete search history.

(56) References Cited

U.S. PATENT DOCUMENTS

| | | | |
|---|---|---|---|
| 8,709,545 B2 | 4/2014 | Larson-Smith et al. | |
| 10,094,220 B2 | 10/2018 | Vontell, Sr. et al. | |
| 11,408,371 B1 | 8/2022 | Holland et al. | |
| 2001/0014409 A1* | 8/2001 | Cohen ................. | H01L 21/2885 205/70 |

(Continued)

FOREIGN PATENT DOCUMENTS

| CN | 102680527 A | * | 9/2012 |
|---|---|---|---|
| CN | 109317377 A | * | 2/2019 |

(Continued)

OTHER PUBLICATIONS

Bjornsen et al. Plasma etching of different polydimethylsiloxane elastomers, effects from process parameters and elastomer composition, Elsevier, Microelectronic Engineering 87 (2010) 67-71 (Year: 2010).*

(Continued)

*Primary Examiner* — David E Sosnowski
*Assistant Examiner* — Ayne A Lambert
(74) *Attorney, Agent, or Firm* — Carlson, Gaskey & Olds, P.C.

(57) ABSTRACT

A repair process includes providing a gas turbine engine article that has an elastomeric coating that has an eroded region, plasma etching the elastomeric coating in the eroded region, and applying an elastomeric repair coating on the eroded region.

8 Claims, 2 Drawing Sheets

(56) References Cited

U.S. PATENT DOCUMENTS

| | | | |
|---|---|---|---|
| 2002/0045053 A1* | 4/2002 | Hoskin | F01D 5/005 427/446 |
| 2005/0161439 A1* | 7/2005 | Wustman | F01D 5/005 216/103 |
| 2007/0231156 A1 | 10/2007 | Hong | |
| 2011/0206533 A1* | 8/2011 | Lee | F01D 9/02 29/889.1 |
| 2012/0148769 A1* | 6/2012 | Bunker | F01D 5/186 427/446 |
| 2014/0127516 A1* | 5/2014 | Wang | C08J 7/0427 528/53 |
| 2016/0186609 A1* | 6/2016 | Holland | F16B 5/04 156/60 |
| 2016/0200936 A1* | 7/2016 | Steinmetz | B05D 7/532 560/190 |
| 2017/0226873 A1* | 8/2017 | Bogue | B29C 73/10 |
| 2022/0333551 A1* | 10/2022 | Holland | B29C 73/10 |

FOREIGN PATENT DOCUMENTS

| | | | |
|---|---|---|---|
| CN | 111229566 A | * | 6/2020 |
| CN | 113928034 A | * | 1/2022 |
| DE | 102017223600 A1 | | 6/2019 |
| EP | 3184180 B1 | | 6/2020 |
| KR | 20120090933 A | * | 8/2012 |
| KR | 20120133671 A | * | 12/2012 |

OTHER PUBLICATIONS

Li et al. CN 111229566_English Machine Translation_Espacenet (Year: 2020).*

European Search Report for European Patent Application No. 24180205.7 mailed Nov. 25, 2024.

* cited by examiner

REPAIR PROCESS USING PLASMA ETCHING

BACKGROUND

Gas turbine engines, such as those that power modern commercial aircraft, include a fan section for propulsion, a compressor section to pressurize a supply of air from the fan section, a combustor section to burn a hydrocarbon fuel in the presence of the pressurized air, and a turbine section to extract energy from the resultant combustion gases in order to power the compressor and fan sections.

The fan includes an array of fan blades that each have an aerodynamic surface contour. The blades may be formed from a composite, a metallic material, or combinations of these materials. A sheath is often secured to the leading edge of the blade to protect against impact from foreign debris injested into the engine. The blades may also have an erosion-resistant coating to protect the surfaces of the blade from being eroded from foreign debris.

SUMMARY

A repair process according to an example of the present disclosure includes providing a gas turbine engine article that has an elastomeric coating that has an eroded region, plasma etching the elastomeric coating in the eroded region, and applying an elastomeric repair coating on the eroded region.

In a further embodiment of any of the foregoing embodiments, the gas turbine engine article is a fan blade.

In a further embodiment of any of the foregoing embodiments, the plasma etching partially removes a surface portion of the elastomeric coating to create a new bonding surface on which the elastomeric repair coating is applied.

In a further embodiment of any of the foregoing embodiments, the elastomeric repair coating has an interfacial tensile strength with respect to the bonding surface of more than 1500 pounds per square inch (psi).

In a further embodiment of any of the foregoing embodiments, the elastomeric coating is selected from the group consisting of silicone, urethane, fluoroelastomer, and combinations thereof.

In a further embodiment of any of the foregoing embodiments, the plasma etching is conducted under an air, oxygen or argon plasma.

In a further embodiment of any of the foregoing embodiments, the plasma etching is conducted for a time from 5 minutes to 60 minutes.

In a further embodiment of any of the foregoing embodiments, the plasma etching is conducted for a time from 20 minutes to 60 minutes.

In a further embodiment of any of the foregoing embodiments, the elastomeric repair coating on the eroded region is flush with the elastomeric coating adjacent the eroded region.

A gas turbine engine article according to an example of the present disclosure includes a substrate, and an elastomeric coating disposed on the substrate. The elastomeric coating has a region in which a surface portion has been removed to create a bonding surface, and an elastomeric repair coating disposed on the bonding surface. The elastomeric repair coating has an interfacial tensile strength with respect to the bonding surface of more than 1500 pounds per square inch (psi).

In a further embodiment of any of the foregoing embodiments, the substrate is an aluminum alloy.

In a further embodiment of any of the foregoing embodiments, the elastomeric coating is selected from the group consisting of silicone, urethane, fluoroelastomer, and combinations thereof.

In a further embodiment of any of the foregoing embodiments, the elastomeric coating is fluoroelastomer and the elastomeric repair coating is silicone.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
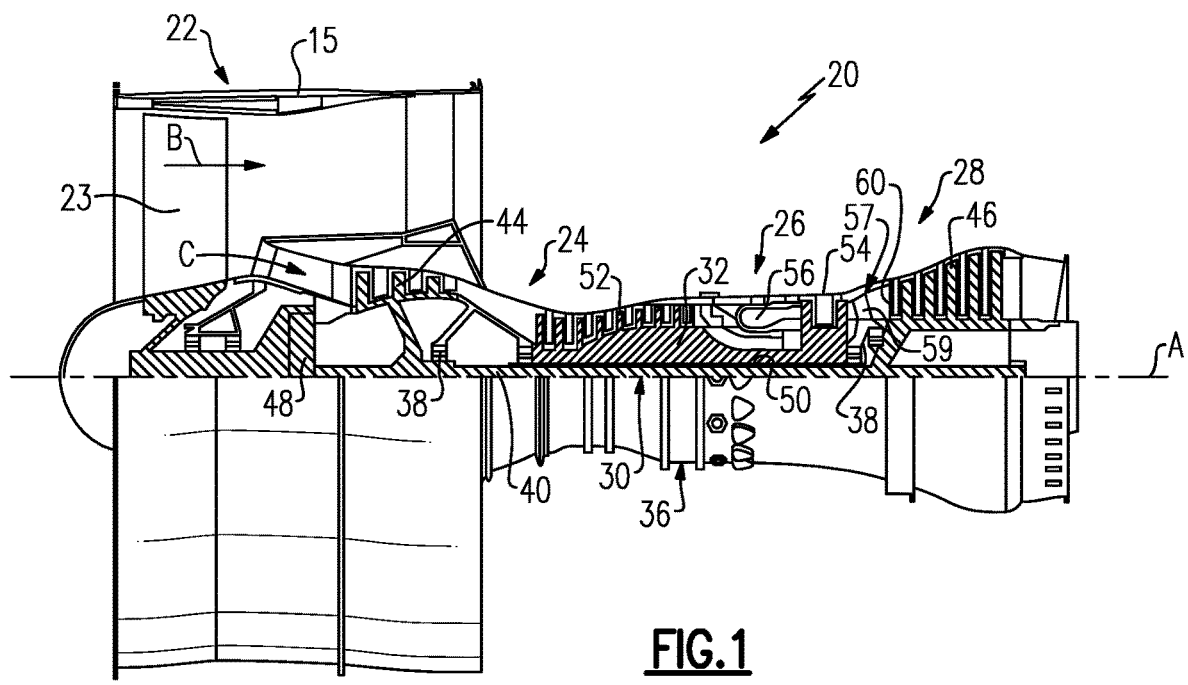
FIG. 1 illustrates a gas turbine engine.

In this disclosure, like reference numerals designate like elements where appropriate and reference numerals with the addition of one-hundred or multiples thereof designate modified elements that are understood to incorporate the same features and benefits of the corresponding elements. Terms such as "first" and "second" used herein are to differentiate that there are two architecturally distinct components or features. Furthermore, the terms "first" and "second" are interchangeable in that a first component or feature could alternatively be termed as the second component or feature, and vice versa.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 includes a row of fan blades 23 that drive air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan section 22 through a speed change mechanism, which in exemplary gas turbine engine 20 is illustrated as a geared architecture 48 to drive a fan section 22 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
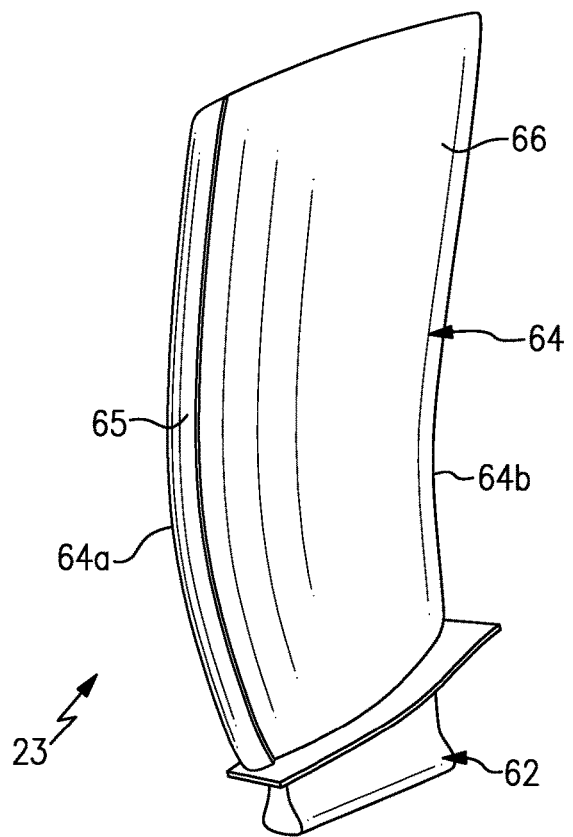
FIG. 2 illustrates an article from the engine.

FIG. 2 illustrates a representative one of the fan blades 23. The blade 23 includes a root section 62 for attaching the blade 23 (gas turbine engine article), such as to a hub in the fan section 22, and an airfoil section 64 that extends radially from the root section 62. The airfoil section 64 defines leading and trailing edges 64a/64b. In this example, a metallic sheath 65 is attached on the leading edge 64a for protecting against foreign object impact. The blade 23 in this example is formed of an aluminum alloy, but may alternatively be formed of other alloys or composite materials. The remainder of the airfoil section 64, including the sides and trailing edge 64b, includes an elastomeric coating 66 that is disposed on the underlying aluminum alloy. A primer layer (not shown) is applied onto the aluminum alloy to promote adhesion of the elastomeric coating 66. The elastomer coating 66 is erosion resistant and protects the underlying alloy from being eroded by foreign objects (e.g., sand) ingested into the engine 20. As an example, the elastomeric coating 66 is a silicone coating, a urethane coating, or a fluroelastomer coating, but is not limited thereto.

Figure 3:
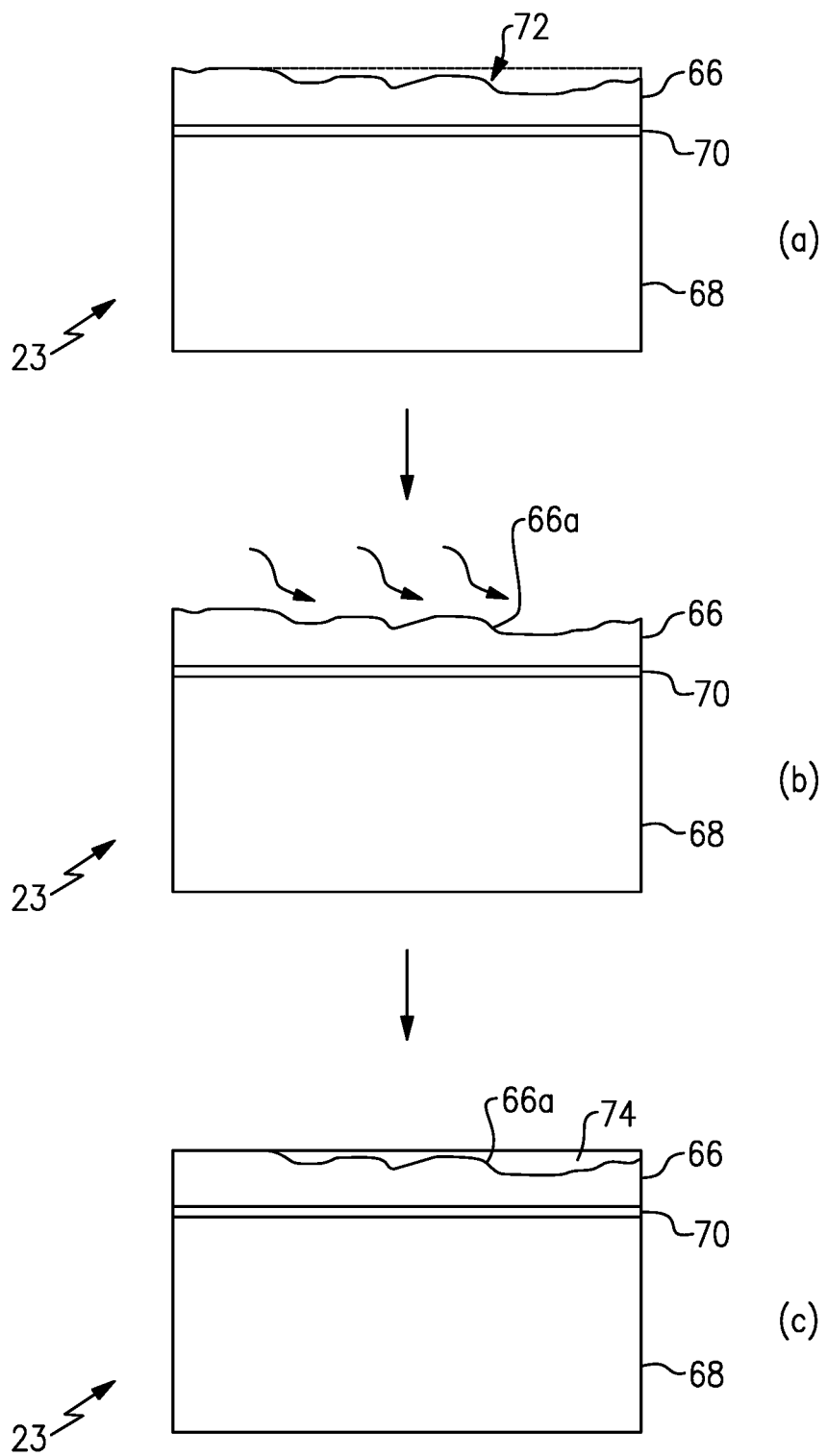
FIG. 3 depicts a repair process using plasma etching.

Although tough, the elastomeric coating 66 can be subject to damage from erosion over time. As the blades 23 in general are expensive to manufacture, it is desirable to be able to repair such damage rather than replace a damaged blade with a new blade. One strategy for repair is to abrade the coating, remove the damaged coating material, and then re-apply a primer as needed and a new surface coating. Such a repair, however, requires removing the eroded coating portion by grit-blasting or sanding, which can leave debris on the repair pre-bond surface, which in turn can debit adhesion and durability of the new repair coating. In this regard, FIG. 3 depicts a repair process that avoids grit-blasting or the like, while providing strong adhesion for good durability. It is to be appreciated that although the process is described with respect to the blade 23, the process may be applied to other gas turbine engine articles that include such elastomeric coatings that require repair.

A cross-section of a representative portion of the blade or other gas turbine engine article is shown at depiction (a). The blade 23 includes the aluminum alloy substrate 68, a primer layer 70 on the substrate 68, and the elastomeric coating 66 on the primer layer 70. The elastomeric coating 66 includes an eroded region 72. For example, the eroded region 72 is a region of the coating 66 which has been lost due to erosion, typically during use of the blade 23 in the engine 20 during service. As a result, the coating 66 is thinner at the eroded region 72 in comparison to the initial thickness of the coating 66, shown by the dashed lines in the figure. Such erosion can occur from sand or other debris entrained in the air that flows across the blade 23.

As shown at depiction (b), the eroded region 72 is then subjected to a plasma etching treatment. Prior to treatment, the eroded region may be cleaned with a solvent, such as an acetone wipe or isopropanol wipe and, optionally, light abrasion. For example, the plasma etching is conducted under an oxygen, air or argon gas environment. The excited ions of the plasma bombards the surface of the eroded region of the coating 66. Without wishing to be bound by any particular theory, the ions physically and chemically interact with the molecules at the surface of the coating 66, thereby causing vaporization and oxidation (under oxygen or air) at the surface. Plasma etching may be used to clean surfaces. However, in this case, as the eroded region 72 likely contains embedded foreign debris, a relatively long process plasma etching process time is used to facilitate removal of a surface portion of the coating 66 and to activate the surface by oxidation to create a new bonding surface 66a. For instance, a low pressure plasma etching is conducted for a time from 5 minutes to 60 minutes. Etching times toward the higher end of the range are used to ensure ample removal of debris and sufficient surface activation for better repair bonding, such as from 20 minutes to 60 minutes.

Following the plasma etching, an elastomeric repair coating 74 is then applied on the new bonding surface 66a. For instance, the elastomeric repair coating 74 is a urethane coating. The repair coating 74 may be applied as a liquid and then cured, such as in air and/or at an elevated temperature. In one example, the repair coating 74 is smoothed or otherwise molded such that the repair coating 74 is flush with the elastomeric coating 66 adjacent the eroded region 72 in order to maintain the aerodynamic surface profile of the blade 23. The repair coating 74 can be a solid coating and a layer of adhesive may be applied on the plasma treated surface prior to applying the repair coating 74 and curing at room temperature or at an elevated temperature.

Due to the removal of embedded debris and activation of the surface 66a, the repair coating 74 forms a strong bond with the underlying coating 66, even where the coating 66 is of a different type than the repair coating 74. Thus, the repair coating 74 can be used on a variety of different types of original elastomeric coatings 66, such as silicone, urethane, or fluoroelastomer. As an example, the elastomeric repair coating 74 has an interfacial tensile strength with respect to the bonding surface 66a of more than 1500 pounds per square inch (psi), as determined by a button pull off test (e.g., per ASTM D7234). In such as test, which may be simulated using test coupons, a button of known area is bonded to the repair coating 74. The button is then pulled while measuring the pull force to determine a stress at which failure occurs. If the repair coating 74 is strongly bonded, failure will occur at other material layers or interface (e.g., the interface between the primer layer and the coating 66 or within primer layer) rather than the bonding interface between the repair coating 74 and the coating 66. The maximum stress at which such failure occurs at another interface indicates that the strength at bonding interface between the repair coating 74 and the coating 66 is greater than that maximum stress. The following examples demonstrate additional aspects of the disclosure.

Example 1

A repair was conducted in accordance with the description above in which a low pressure plasma etching was conducted in air under a plasma power of approximately 2 kW for 20 minutes. A urethane erosion coating was applied on the plasma treated repair surface and then cured at room temperature for 5 days. An aluminum button with an area of approximately 150 mm$^2$ was then bonded to the repair coating using a paste epoxy. The button was then subjected to a pulling force at 150 psi/sec. Failure occurred within the primer or primer/erosion coating interface (not the interface between the repair coating and the original coating) at approximately 2750 psi.

Example 2

A repair was conducted in accordance with the description above in which a low pressure plasma etching was conducted in argon for 5 min and air for 15 min under a plasma power of approximately 2 kW for 20 minutes. A urethane erosion coating was applied on the plasma treated repair surface and then cured at room temperature for 5 days. An aluminum button with an area of approximately 150 mm$^2$ was then bonded to the repair coating using a paste epoxy. The button was then subjected to a pulling force at 150 psi/sec. Failure occurred within the primer or primer/erosion coating interface (not the interface between the repair coating and the original coating) at approximately 3000 psi.

Example 3

A repair was conducted in accordance with the description above in which a low pressure plasma etching was conducted in air under a plasma power of approximately 2 kW for 40 minutes. A urethane erosion coating was applied on the plasma treated repair surface and then cured at room temperature for 5 days. An aluminum button with an area of approximately 150 mm$^2$ was then bonded to the repair coating using a paste epoxy. The button was then subjected to a pulling force at 150 psi/sec. Failure occurred within the primer or primer/erosion coating interface (not the interface between the repair coating and the original coating) at approximately 3400 psi.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A repair process comprising:
    providing a gas turbine engine article that includes an aluminum alloy substrate and an elastomeric coating disposed on the aluminum alloy substrate, and the elastomeric coating has an eroded region;
    plasma etching the elastomeric coating in the eroded region, the plasma etching partially removing a surface portion of the elastomeric coating to create a new bonding surface on the elastomeric coating without removal of the elastomeric coating down to the aluminum alloy substrate; and
    applying an elastomeric repair coating on the new bonding surface.

2. The repair process as recited in claim 1, wherein the gas turbine engine article is a fan blade.

3. The repair process as recited in claim 1, wherein the elastomeric coating is selected from the group consisting of silicone, urethane, fluoroelastomer, and combinations thereof.

4. The repair process as recited in claim 1, wherein the plasma etching is conducted under an air, oxygen or argon plasma.

5. The repair process as recited in claim 4, wherein the plasma etching is conducted for a time from 5 minutes to 60 minutes.

6. The repair process as recited in claim 1, wherein the plasma etching is conducted for a time from 20 minutes to 60 minutes.

7. The repair process as recited in claim 1, wherein the elastomeric repair coating on the eroded region is flush with the elastomeric coating adjacent the eroded region.

8. The repair process as recited in claim 1, wherein the elastomeric repair coating has an interfacial tensile strength with respect to the bonding surface of 1500 pounds per square inch (psi) up to approximately 3400 psi.

* * * * *